United States Patent Office 3,311,642
Patented Mar. 28, 1967

3,311,642
PYRANYLATION OF AMIDES
Gino J. Marco, Webster Groves, and Angelo John Speziale, Creve Coeur, Mo., assignors to Monsanto Company, a corporation of Delaware
No Drawing. Filed Oct. 11, 1961, Ser. No. 144,293
8 Claims. (Cl. 260—345.7)

This invention relates to new and useful N-(2-tetrahydropyranyl) amides and to methods of making same.

In accordance with this invention there is provided a new and useful class of compounds, namely N-(2-tetrahydropyranyl) amides of the formula

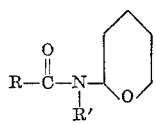

wherein R and R' are like or unlike hydrocarbyl radicals or said hydrocarbyl radicals further substituted with substituents such as chloro, bromo, nitro, cyano, lower alkoxy, lower alkylthio, di(lower alkyl)amino, and lower alkylcarbonyl. R' can also be, and is preferably, hydrogen.

These amides can be prepared in a facile manner by reacting 2,3-dihydropyran with an amide of the formula

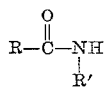

wherein R and R' have the above described significance in the presence of an acid catalyst. While a wide range of reaction temperatures can be used provided the system is fluid (i.e. temperatures above the freezing point of the system up to and including the boiling point of the system) it is preferred to employ a reaction temperature in the range of from about 30° C. to about 125° C. Where and when desired an inert organic solvent can be used, as for example benzene, toluene, xylene, acetone, butanone, dioxane, dimethylformamide, dimethylsulfoxide, and the like. In those instances wherein it is desirable to employ an inert organic solvent it is preferred to employ a mixture of dimethylformamide and a liquid aromatic hydrocarbon (e.g., benzene, toluene, xylene, etc.) in the range in parts by weight of 25 to 75 of the former to 75 to 25 of the latter.

By "hydrocarbyl radical" as employed herein and in the appended claims is meant any hydrocarbon radical containing 1 to 12 carbon atoms and includes the various alkyl, alkenyl, alkynyl, cycloalkyl, cycloalkenyl, aralkyl, aryl and alkaryl radicals the hydrogen substituents of which in the case of substituted hydrocarbyl radicals being replaced with one or more substituents such as chloro, bromo, nitro, cyano, lower alkoxy, lower alkylthio, di (lower alkyl)amino, and lower alkylcarbonyl. As illustrative of such are methyl, ethyl, propyl, butyl, amyl, hexyl, octyl, decyl, dodecyl, allyl, butenyl, pentenyl, dodecenyl, propargyl, butynyl, cyclopentyl, cyclohexyl, cycloheptyl, methylcyclohexyl, bicyclohexyl, cyclohexylmethyl, cyclopentenyl, cyclohexenyl, benzyl, phenethyl, phenpropyl, cinnamyl, phenyl, biphenylyl, naphthyl, indanyl, indenyl, tolyl, xylyl, ethylphenyl, butylphenyl, hexylphenyl, and the various isomeric forms thereof, and also the substituted forms thereof as for example, chloromethyl, chloroethyl, chloropropyl, chlorobutyl, chloroallyl, chlorophenyl, ar-chlorobenzyl, bromoethyl, bromophenyl, nitroethyl, nitrobutyl, nitrophenyl, cyanoethyl, cyanobutyl, cyanophenyl, methoxyethyl, ethoxyethyl, isoamyloxyethyl, methoxyphenyl, ethoxyphenyl, isoamyloxyphenyl, methylthioethyl, ethylthioethyl, methylthiophenyl, ethylthiophenyl, isoamylthiophenyl, dimethylamino, diethylamino, diisoamylamino, acetyl, acetonyl, propionyl, butyryl, and the like.

The amide reactants of the process of this invention as aforementioned are of the structure

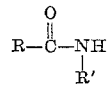

wherein R and R' have the aforedescribed significance. Of this class of amide reactants several groups falling therein provide highly useful N-(2-tetrahydropyranyl) amides and they are:

(A) Those wherein R and R' are hydrocarbyl radicals free of non-benzenoid unsaturation (i.e., free of olefinic and acetylenic unsaturation) such as the various alkyl, cycloalkyl, and aryl radicals as exemplified by methyl, ethyl, propyl, butyl, amyl, hexyl, phenyl, cyclopentyl, cyclohexyl, and the various isomeric forms thereof containing 1 to 6 carbon atoms, (B) Those wherein R' is hydrogen and wherein R has the significance as in (A) immediately above, and (C) Those wherein R' is hydrogen and wherein R is a primary 1-chloroalkyl radical containing from 1 to 4 carbon atoms as for example 1-chloromethyl, 1-chloroethyl, 1-chloro-n-propyl, 1-chloro-n-butyl, 1-chloro-isobutyl, and the various isomeric forms thereof.

As specifically illustrative of the amide reactants of the process of this invention but not limitative thereof are acetamide, propionamide, n-butyramide, isobutyramide, n-valeramide, n-caproamide, n-heptanoamide, lauramide, acrylamide, benzamide, p-toluic acid amide, 1-naphthoic acid amide, a-phenylacetamide, cyclohexanoamide, benzanalide, acetanilide, N-methylacetamide, N-phenyl-n-valeramide, N-cyclohexyl-n-butyramide, a-chloroacetamide, a-chloropropionamide, a-chloroisovaleramide, a-chloroacetanilide, 4-chlorobenzamide, 4-bromobenzamide, 4-nitrobenzamide, 4-cyanobenzamide, 4-methoxybenzamide, b-(2-ethoxy)propionamide, 4-(dimethylamino)benzamide, 4-(acetyl)benzamide, etc.

As illustrative of the process of this invention but not limitative thereof is the following:

*Example I*

To a suitable reaction vessel equipped with a thermometer, agitator and reflux condenser is charged 11.8 parts by weight (substantially 0.2 mol) of acetamide, 16.8 parts by weight (substantially 0.2 mol) of 2,3-dihydropyran, and approximately 45 parts by weight of benzene. While agitating and at room temperature there is added approximately 0.16 part by weight of hydrogen chloride in approximately 0.71 part by weight of diethyl ether. The mixture is then refluxed for about two hours. Thereafter the reaction mass is cooled to room temperature and neutralized with solid sodium carbonate. The neutralized mass is filtered and the filtrate subjected to vacuum distillation at 60° C. to remove the volatiles. The residue, a solid, is N-(2-tetrahydropyranyl) acetamide. Upon recrystallizing this solid from a mixture of benzene and diethyl ether the melting point is found to be 119.5–121° C.

*Example II*

Employing the procedure of Example I but replacing acetamide with a substantially equimolecular amount of propionamide there is obtained N-(2-tetrahydropyranyl) propionamide.

*Example III*

Employing the procedure of Example I but replacing acetamide with a substantially equimolecular amount of a-bromopropionamide there is obtained N-(2-tetrahydropyranyl) a-bromopropionamide.

Example IV

Employing the procedure of Example I but replacing acetamide with a substantially equimolecular amount of a-phenylacetamide there is obtained N-(2-tetrahydropyranyl) a-phenylacetamide.

Example V

Employing the procedure of Example I but replacing acetamide with a substantially equimolecular amount of b-(ethoxy)propionamide there is obtained N-(2-tetrahydropyranyl) b-(ethoxy)propionamide.

Example VI

Employing the procedure of Example I but replacing acetamide with a substantially equimolecular amount of b-(ethylthio)propionamide there is obtained N-(2-tetrahydropyranyl) b-(ethylthio)propionamide.

Example VII

To a suitable reaction vessel equipped with a thermometer, agitator and reflux condenser is charged 8.7 parts by weight (substantially 0.1 mol) of isobutyramide, 8.4 parts by weight (substantially 0.1 mol) of 2,3-dihydropyran, and approximately 50 parts by weight of benzene. While agitating and at room temperature there is added approximately 0.08 part by weight of hydrogen chloride in approximately 0.35 part by weight of diethyl ether. The mixture is then refluxed for 2 hours. Thereafter the reaction mass is cooled to room temperature, filtered, and the filtrate subjected to vacuum distillation at 40–50° C. to remove the volatiles. The residue, a solid, is N-(2-tetrahydropyranyl) isobutyramide. Upon recrystallizing this solid from a benzene-ether mixture the melting point is found to be 111° C.

Example VIII

Employing the procedure of Example VII but replacing isobutyramide with a substantially equimolecular amount of acrylamide there is obtained N-(2-tetrahydropyranyl) acrylamide.

Example IX

Employing the procedure of Example VII but replacing isobutyramide with a substantially equimolecular amount of 4-cyano-n-valeramide there is obtained N-(2-tetrahydropyranyl) 4-cyano-n-valeramide.

Example X

Employing the procedure of Example VII but replacing isobutyramide with a substantially equimolecular amount of N-phenylisobutyramide there is obtained N-(tetrahydropyranyl) N-phenylisobutyramide.

Example XI

To a suitable reaction vessel equipped with a thermometer, agitator and reflux condenser is charged 17.4 parts by weight (substantially 0.2 mol) of n-butyramide, 16.8 parts by weight (substantially 0.2 mol) of 2,3-dihydropyran, and approximately 50 parts by weight of benzene. While agitating and at room temperature there is added approximately 0.16 part by weight of hydrogen chloride in approximately 0.71 part by weight of diethyl ether. The mixture is then refluxed for 2 hours. Thereafter the reaction mass is cooled to room temperature, filtered, and the filtrate subjected to vacuum distillation at 40–50° C. to remove the volatiles. The residue, a solid, is N-(2-tetrahydropyranyl) n-butyramide. Upon recrystallizing this solid from ether the melting point is found to be 51.5–52.5° C.

Example XII

Employing the procedure of Example XI but replacing n-butyramide with a substantially equimolecular amount of lauramide there is obtained N-(2-tetrahydropyranyl) lauramide.

Example XIII

Employing the procedure of Example XI but replacing n-butyramide with a substantially equimolecular amount of b-(acetonyl)propionamide there is obtained N-(2-tetrahydropyranyl) b-(acetonyl)propionamide.

Example XIV

To a suitable reaction vessel equipped with a thermometer, agitator and reflux condenser is charged 12.1 parts by weight (substantially 0.1 mol) of benzamide, 8.4 parts by weight (substantially 0.1 mol) of 2,3-dihydropyran, and approximately 50 parts by weight of benzene. While agitating and at room temperature there is added approximately 0.08 part by weight of hydrogen chloride in approximately 0.35 part by weight of diethyl ether. The mixture is then refluxed for 2 hours. Thereafter the reaction mass is cooled to room temperature, filtered, and the filtrate subjected to vacuum distillation at 40–50° C. to remove the volatiles. The residue, a solid, is N-(2-tetrahydropyranyl) benzamide. Upon recrystallizing this solid from a benzene-ether mixture the melting point is found to be 124–125° C.

Example XV

Employing the procedure of Example XIV but replacing benzamide with a substantially equimolecular amount of N-methyl-benzamide there is obtained N-(2-tetrahydropyranyl) N-methyl-benzamide.

Example XVI

Employing the procedure of Example XIV but replacing benzamide with a substantially equimolecular amount of 4-cyanobenzamide there is obtained N-(2-tetrahydropyranyl) 4-cyanobenzamide.

Example XVII

Employing the procedure of Example XIV but replacing benzamide with a substantially equimolecular amount of 4-chlorobenzamide there is obtained N-(2-tetrahydropyranyl) 4-chlorobenzamide.

Example XVIII

To a suitable reaction vessel equipped with a thermometer, agitator and reflux condenser is charged 6.8 parts by weight (substantially 0.05 mol) of p-toluamide, 4.2 parts by weight (substantially 0.05 mol) of 2,3-dihydropyran, and a mixture of approximately 25 parts by weight of benzene and 25 parts by weight of dimethylformamide. While agitating and at room temperature there is added approximately 0.08 part by weight of hydrogen chloride in approximately 0.35 part by weight of diethyl ether. The mixture is then refluxed for 2 hours. Thereafter the reaction mass is cooled to room temperature, filtered, and the filtrate subjected to vacuum distillation at 60° C. to remove the volatiles. The residue, a solid, is N-(2-tetrahydropyranyl) p-toluamide. Upon recrystallizing this solid from a benzene-hexane mixture the melting point is found to be 127–128° C.

Example XIX

Employing the procedure of Example XVIII but replacing p-toluamide with a substantially equimolecular amount of 3,4-dichlorobenzamide there is obtained N-(2-tetrahydropyranyl) 3,4-dichlorobenzamide.

Example XX

Employing the procedure of Example XVIII but replacing p-toluamide with a substantially equimolecular amount of 4-ethoxybenzamide there is obtained N-(2-tetrahydropyranyl) 4-ethoxybenzamide.

Example XXI

Employing the procedure of Example XVIII but replacing p-toluamide with a substantially equimolecular amount of 4-(n-butylthio)benzamide there is obtained N-(2-tetrahydropyranyl) 4-(n-butylthio)benzamide.

*Example XXII*

To a suitable reaction vessel equipped with a thermometer, agitator and reflux condenser is charged 8.3 parts by weight (substantially 0.05 mol) of 4-nitrobenzamide, 4.2 parts by weight (substantially 0.05 mol) of 2,3-dihydropyran, and a mixture of approximately 25 parts by weight of benzene and 20 parts by weight of dimethylformamide. While agitating and at room temperature there is added approximately 0.08 part by weight of hydrogen chloride in approximately 0.35 part by weight of diethyl ether. The mixture is then refluxed for 2 hours. Thereafter the reaction mass is cooled to room temperature, filtered, and the filtrate subjected to vacuum distillation at 60° C. to remove the volatiles. The residue, a solid, is N-(2-tetrahydropyranyl) 4-nitrobenzamide. Upon recrystallizing this solid from a benzene-methanol mixture the melting point is found to be 179–179.5° C.

*Example XXIII*

Employing the procedure of Example XXII but replacing 4-nitrobenzamide with a substantially equimolecular amount of N-phenyl-4-nitrobenzamide there is obtained N-(2-tetrahydropyranyl) N-phenyl-4-nitrobenzamide.

*Example XXIV*

Employing the procedure of Example XXII but replacing 4-nitrobenzamide with a substantially equimolecular amount of 3-chloro-4-nitrobenzamide there is obtained N-(tetrahydropyranyl) 3-chloro-4-nitrobenzamide.

*Example XXV*

Employing the procedure of Example XXII but replacing 4-nitrobenzamide with a substantially equimolecular amount of 4-isoamyloxybenzamide there is obtained N-(tetrahydropyranyl) 4-isoamyloxybenzamide.

*Example XXVI*

To a suitable reaction vessel equipped with a thermometer, agitator and reflux condenser is charged 47 parts by weight (substantially 0.5 mol) of a-chloroacetamide, 42 parts by weight (substantially 0.5 mol) of 2,3-dihydropyran, and a mixture of approximately 150 parts by weight of benzene and 50 parts by weight of dimethylformamide. While agitating and at room temperature there is added approximately 0.4 part by weight of hydrogen chloride in approximately 1.75 parts by weight of diethyl ether. The mixture is then refluxed for 2 hours. Thereafter the reaction mass is cooled to room temperature, filtered, and the filtrate subjected to vacuum distillation at 60° C. to remove the volatiles. The residue, a solid, is N-(2-tetrahydropyranyl) a-chloroacetamide. Upon recrystallizing this solid from benzene the melting point is found to be 94–95° C.

*Example XXVII*

Employing the procedure of Example XXVI but replacing a-chloroacetamide with a substantially equimolecular amount of a-chloro-n-valeramide there is obtained N-(2-tetrahydropyranyl) a-chloro-n-valeramide.

*Example XXVIII*

Employing the procedure of Example XXVI but replacing a-chloroacetamide with an equimolecular amount of 4-(diethylamino)-n-butyramide there is obtained N-(2-tetrahydropyranyl) 4-(diethylamino)-n-butyramide.

*Example XXIX*

Employing the procedure of Example XXVI but replacing a-chloroacetamide with an equimolecular amount of 4-nitro-n-butyramide there is obtained N-(2-tetrahydropyranyl) 4-nitro-n-butyramide.

*Example XXX*

To a suitable reaction vessel equipped with a thermometer, agitator and reflux condenser is charged 14.6 parts by weight (substantially 0.1 mol) of N-methyl-acetamide, 17 parts by weight (substantially 0.2 mol) of 2,3-dihydropyran, and approximately 50 parts by weight of benzene. While agitating and at room temperature there is added approximately 0.08 part by weight of hydrogen chloride in approximately 0.35 part by weight of diethyl ether. The mixture is then refluxed for 17 hours. Thereafter the reaction mass is cooled to room temperature, filtered, and the filtrate subjected to vacuum distillation at 40–50° C. to remove the volatiles. The residue, an oil, is identified as N-(2-tetrahydropyranyl) N-methyl acetamide by infrared analysis.

*Example XXXI*

Employing the procedure of Example XXX but replacing N-methyl acetamide with a substantially equimolecular amount of N-cyclohexylacetamide there is obtained N-(2-tetrahydropyranyl) N-cyclohexylacetamide.

*Example XXXII*

To a suitable reaction vessel equipped with a thermometer, agitator and reflux condenser is charged 28 parts by weight (substantially 0.32 mol) of N-ethyl acetamide, 29 parts by weight (substantially 0.35 mol) of 2,3-dihydropyran, and approximately 75 parts by weight of benzene. While agitating and at room temperature there is added approximately 0.08 part by weight of hydrogen chloride in approximately 0.35 part by weight of diethyl ether. The mixture is then refluxed for 17 hours. Thereafter the reaction mass is cooled to room temperature, filtered, and the filtrate subject to vacuum distillation at 40–50° C. to remove the volatiles. The residue, an oil, which according to infrared analysis contains about 45% by weight N-(2-tetrahydropyranyl) N-ethylacetamide.

*Example XXXIII*

Employing the procedure of Example XXXII but replacing N-ethyl acetamide with a substantially equimolecular amount of N-(2-chloroethyl) acetamide there is obtained N-(2-tetrahydropyranyl) N-(2-chloroethyl) acetamide.

*Example XXXIV*

To a suitable reaction vessel equipped with a thermometer, agitator and reflux condenser is charged 13.5 parts by weight (substantially 0.1 mol) of N-phenyl acetamide, 10 parts by weight (substantially 0.12 mol) of 2,3-dihydropyran, and approximately 50 parts by weight of benzene. While agitating and at room temperature there is added approximately 0.08 part by weight of hydrogen chloride in approximately 0.35 part by weight of diethyl ether. The mixture is then refluxed for 16 hours. Thereafter the reaction mass is cooled to room temperature, filtered, and the filtrate subjected to vacuum distillation at 40–50° C. to remove the volatiles. The residue, an oil, which according to infrared analysis contains about 35% by weight N-(2-tetrahydropyranyl) N-phenylacetamide.

*Example XXXV*

Employing the procedure of Example XXXIV but replacing N-phenyl acetamide with a substantially equimolecular amount of benzanilide there is obtained N-(2-tetrahydropyranyl) benzanilide.

Other acid catalysts than hydrogen chloride which are operable include the strong mineral acids such as hydrogen bromide, sulfuric acid, and the like, and the aromatic sulfonic acids such as benzene sulfonic acid p-toluene sulfonic acid, and the like. Any catalytic amount of the acid catalyst can be used but in general from 0.01 to 2 percent by weight based on the 2,3-dihydropyran charged will be employed in preparing the N-(2-tetrahydropyranyl) amides of this invention.

The N-(2-tetrahydropyranyl) amides of this invention are useful as soil and/or foliage fungicides. To illustrate their activity is the following:

Quadruplet cucumber plants (14 to 21 days old) having the first leaf the size of a half-dollar are sprayed to "run-off" with an aqueous emulsion containing 1250 p.p.m. of N-(2 - tetrahydropyranyl) N-methylacetamide at a rate of 10 ml. per 45 seconds using 10 pounds air pressure while rotating the plants on a turntable in a spray chamber. For control purposes one leaf of each plant is covered with a plastic shield prior to spraying. After spraying to "run-off" the spray deposit is permitted to dry and the treated and untreated leaves of each plant are sprayed with a spore susupension containing 30,000 to 40,000 conidal spores of Colletotrichum lagenarium per ml. The so-inoculated plants are placed immediately in a 100% humid atmosphere at 70° C. After 36 hours the plants are removed to the greenhouse. After 3 to 5 days lesion counts are made on the first leaf of each plant. There were no lesions on the first leaf of each plant treated with N-(2-tetrahydropyranyl) N-methylacetamide however the respective control or untreated leaves displayed more than 50 lesions per leaf.

The new compounds are also valuable fungicides against soil-borne pathogens. Activity was demonstrated by pipetting a 5 ml. aliquot of a 1% solution of the test material into a Mason jar containing one pound of infected soil. This amounts to 100 p.p.m. of the test material. The jar was sealed and the contents thoroughly mixed by vigorous shaking. The treated soil was incubated at room temperature and 24 hours later transferred to 4 inch clay pots. Five seeds of each of four crop plants, beans, cotton, cucumber and peas, were sown in each pot. The seeded pots were then incubated at 70° F. and at high humidity (98% R.H.) to insure activity of the "damping-off" organisms in the soil. Twenty-four hours later, the pots were removed to a greenhouse where disease assessments were made 10–14 days later. The percent emergence and disease incidence was recorded. The measure of effectiveness was the number of healthy plants emerging out of 20. Ten or less healthy plants are observed with an untreated control and threfore a test material giving a sum of 11 or less is regarded as inactive whereas more than 17 is rated excellent, 15–17 promising and 12–14 fair. The figures in the table below are averages of two replications.

Test material:               Healthy plants out of 20
    N-(2-tetrahydropyranyl) a-chloroacetamine ___ 16
    N-(2-tetrahydropyranyl) N-phenylacetamide ___ 16
    Untreated control _____ 2

The compounds of this invention were also observed to be wheat rust eradicants, particularly N-(2-tetrahydropyranyl) benzamide.

Although the novel fungicidal agents of this invention are useful per se in controlling a wide variety of fungal organisms, it is preferable that they be supplied to the organisms or to the environment of the organisms in a dispersed form in a suitable extending agent.

In the instant specification and appended claims it is to be understood that the term "dispersed" is used in its widest possible sense. When it is said that the fungicidal agents of this invention are dispersed, it means that the particles of the fungicidal agents of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dust. The term "dispersed" also includes mixtures which are suitable for use as aerosols including solutions, suspensions, or emulsions of the fungicidal agents of this invention in a carrier such as dichloro-difluoromethane and like fluorochloroalkanes which boil below room temperature at atmospheric pressure.

In the instant specification and appended claims it is to be understood that the expression "extending agent" includes any and all of those substances in which the fungicidal agents of this invention are dispersed. It includes, therefore, the solvents of a true solution, the liquid phase of suspensions, emulsions or aerosols, the semi-solid carrier of ointments and the solid phase of particulate solids, e.g., pellets, granules, dusts and powers.

The exact concentration of the fungicidal agents of this invention employed in combatting or controlling fungal oragansms can vary considerably provided the required dosage (i.e., toxic or lethal amount) thereof is supplied to the organisms or to the environment of the organisms. When the extending agent is a liquid or mixture of liquids (e.g., as in solutions, suspensions, emulsions, or aerosols) the concentration of the fungicidal agent employed to supply the desired dosage generally will be in the range of 0.001 to 50 percent by weight. When the extending agent is a semi-solid or solid, the concentration of the fungicidal agent employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared fungicidal spray or particulate solid. In such a concentrate composition, the fungicidal agent generally will be present in a concentration of 5 to 95 percent by weight, the residue being any one or more of the well-known fungicidal adjuvants, such as the various surface active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the fungicidal agents of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g., those boiling almost entirely under 400° F., at atmospheric pressure and having a flash point above about 80° F., particularly kerosene), mineral oils having an unsulfonatable residue above about 80 percent and preferably above about 90 percent. In those instances wherein there may be concern about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the fungicidal agents of this invention are to be supplied to the fungal organisms or to the environment of the organisms as aerosols, it is convenient to dissolve them in a suitable solvent and disperse the resulting solution in dichlorodifluoromethane or like chlorofluoroalkane which boils below room temperature at atmospheric pressure.

The fungicidal agents of this invention are preferably supplied to the fungal organisms or to the environment of the organisms in the form of emulsions or suspensions. Emulsions or suspensions are prepared by dispersing one or more fungicidal agents of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agents," "wetting agents" and "spreading agents" that are adapted to be admixed with the fungicidal agents of this invention in order to secure better wetting and spreading of the active ingredients in the water vehicle or carrier in which they are insoluble through lowering the surface tension of the water (see also Frear "Chemistry of Insecticides, Fungicides and Herbicides," second edition page 280). These surfactants include the well-known capillary-active substances which may be anion-active (or anionic), cation active (or cationic), or non-ionizing (or non-ionic) which are described in detail in volume I and II of Schwartz, Perry and Berch's "Surface Active Agents and Detergents" (1958, Interscience Publishers, Inc., New York) and also in the November 1947 issue of Chemical Industries (pages 811–824) in an article entitled, "Synthetic Detergents," by John W. McCutcheon and also in the July, August, September and October 1952 issues of Soap and Sanitary Chemicals under the title, "Synthetic Detergents." The disclosures of these articles with respect to surfactants, i.e., the anion active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued Aug. 5, 1958). In general it is preferred that a mixture of water-soluble anionic and water-soluble non-ionic surfactants be employed.

The fungicidal agents of this invention can be dispersed by suitable methods (e.g., tumbling or grinding) in solid extending agents either of organic or inorganic nature and supplied to the fungal organism's environment in particulate form. Such solid materials include for example, tricalcium phosphate, calcium carbonate, kaolin, bole, kieselguhr, talc, bentonite, fuller's earth, pyrophillite diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g., bentonite. These mixtures can be used for fungicidal purposes in the dry form, or, by addition of water-soluble surfactants or wetting agents the dry particulate solids can be rendered wettable by water so as to obtain stable aqueous dispersions or suspensions suitable for use as sprays.

For special purposes the fungicidal agents of this invention can be dispersed in a semi-solid extending agent such as petrolatum or soap (e.g., sodium stearate or oleate or palmitate or mixtures thereof) with or without the aid of solubility promotors and/or surfactants or dispersing agents.

In all of the forms described above the dispersions can be provided ready for use in combatting fungal organisms or they can be provided in a concentrated form suitable for mixing with or dispersing in other extending agents. As illustrative of a particularly useful concentrate is an intimate mixture of one or more fungicidal agents of the invention with a water-soluble surfactant which lowers the surface tension of water in the weight proportions of 0.1 to 15 parts of surfactant with sufficient of the fungicidal agent of this invention to make 100 parts by weight. Such a concentrate is particularly adapted to be made into a spray for combatting various forms of fungal organisms by the addition of water thereto. As illustrative of such a concentrate is an intimate mixture of 95 parts by weight of N-(2-tetrahydropyranyl) N-methylacetamide and 5 parts by weight of a water-soluble non-ionic surfactant such as the polyoxyethylene derivative of sorbitan monolaurate.

Another useful concentrate adapted to be made into a spray for combatting fungal organisms is a solution (preferably as concentrated as possible) of one or more fungicidal agents of this invention in an organic solvent therefor. The said liquid concentrate preferably contains dissolved therein a minor amount (e.g., 0.5 to 10 percent by weight of the weight of the new fungicidal agent) of a surfactant (or emulsifying agent), which surfactant is also water-soluble. As illustrative of such a concentrate is a solution of N-(2-tetrahydropyranyl) N-methylacetamide in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of hexitol anhydrides such as mannitan or sorbitan.

In all of the various dispersions described hereinbefore for fungicidal purposes, the active ingredients can be one or more of the compounds of this invention. The compounds of this invention can also be advantageously employed in combination with other pesticides, including, for example, insecticides, nematocides, bacterocides, and herbicides. In this manner it is possible to obtain mixtures which are effective against a wide variety of pests and other forms of noxious life.

In controlling or combatting fungal organisms the fungicidal agents of this invention either per se or compositions comprising same are supplied to the fungal organisms or to their environment in a lethal or toxic amount. This can be done by dispersing the new fungicidal agent or fungicidal composition comprising same in, on or over an infested environment or in, on or over an environment the fungal organisms frequent, e.g., agricultural soil or other growth media or other media infested with the fungal organisms or attractable to the organisms for habitational or sustenance or propagational purposes, in any conventional fashion which permits contact between the organisms and the fungicidal agents of this invention. Such dispersing can be brought about by applying the fungicidal agent per se or sprays or particulate solid compositions containing same to a surface infested with the fungal organisms or attractable to the organisms, as for example, the surface of agricultural soil or other media such as the above ground surface of plants by any of the conventional methods, e.g., power dusters, boom and hand sprayers, and spray dusters. Also for sub-surface application such dispersing can be carried out by simply mixing the new fungicidal agent per se or fungicidal spray or particulate solid compositions comprising same with the infested environment or with the environment the fungal organisms frequent, or by employing a liquid carrier for the new fungicidal agent to accomplish sub-surface penetration and impregnation therein.

The embodiments of the invention, in which an exclusive property or privilege is claimed, are defined as follows:

1. N-(2-tetrahydropyranyl) amide of the formula

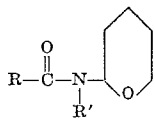

wherein R and R' are hydrocarbyl radicals containing from 1 to 6 carbon atoms and are free of non-benzenoid unsaturation.

2. N-(2-tetrahydropyranyl) amide of the formula

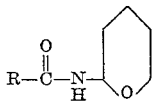

wherein R is a hydrocarbyl radical containing from 1 to 6 carbon atoms and is free of non-benzenoid unsaturation.

3. N-(2-tetrahydropyranyl) amide of the formula

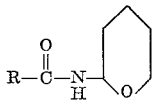

wherein R is a primary 1-chloroalkyl radical containing from 1 to 4 carbon atoms.

4. N-(2-tetrahydropyranyl) a-chloroacetamide.
5. N-(2-tetrahydropyranyl) acetamide.
6. N-(2-tetrahydropyranyl) N-methylacetamide.
7. N-(2-tetrahydropyranyl) N-phenylacetamide.
8. N-(2-tetrahydropyranyl) benzamide.

References Cited by the Examiner
UNITED STATES PATENTS

| | | | |
|---|---|---|---|
| Re. 23,966 | 3/1955 | Mehltretter | 260—345.7 |
| 2,429,098 | 10/1947 | Ladd | 167—33 |
| 2,460,188 | 1/1949 | O'Kane et al. | 167—33 |
| 2,681,351 | 6/1954 | Whittingham et al. | 260—345.7 |
| 2,929,702 | 3/1960 | Speziale | 260—347.3 X |
| 3,014,046 | 12/1961 | Speziale | 260—347.3 |
| 3,099,661 | 7/1963 | Ratts | 260—345.7 |

FOREIGN PATENTS 567,971   12/1958   Canada.

OTHER REFERENCES

Speziale et al.: J. Am. Chem. Soc., vol. 78, pp. 5580–84 (1956).

Speziale et al.: Journal Agricultural and Food Chemistry, vol. 5, No. 1, pp. 30–32 (1957).

Glacet et al.: Comptes Rendus, vol. 247, pp. 305–307 (1958).

Glacet et al.: Comptes Rendus, vol. 248, pp. 1347–1349.

Glacet et al.: Comptes Rendus, vol. 253, pp. 681–683 (July 1961).

WALTER A. MODANCE, *Primary Examiner.*

N. S. MILESTONE, N. STEPNO, *Assistant Examiners.*